United States Patent Office 3,507,798
Patented Apr. 21, 1970

3,507,798
BUILT DETERGENTS CONTAINING NON-
IONIC POLYOXYALKYLENE SURFACE
ACTIVE MATERIALS
Richard R. Egan, Edina, and Leon D. Smiens, Minneapolis, Minn., assignors to Ashland Oil & Refining Company, Ashland, Ky., a corporation of Kentucky
No Drawing. Original application Nov. 8, 1965, Ser. No. 506,900. Divided and this application Feb. 26, 1968, Ser. No. 707,944
Int. Cl. C11d 3/075
U.S. Cl. 252—135     3 Claims

ABSTRACT OF THE DISCLOSURE

Alkylene oxide condensates of long, straight chain primary alcohols having randomly distributed oxyethylene and oxypropylene units in the ratio of 2/1 to 4.5/1 and a total of 12 to 20 oxyalkylene units, are used in built detergent formulations.

---

This application is a division of our copending application Ser. No. 506,900, filed Nov. 8, 1965, now Patent No. 3,382,285.

The invention relates to built detergents containing polyoxyalkylene surface-active materials.

Detergents are well known compositions which find wide use throughout industry and in the home in appliications where it is desirable to reduce the surface tension of water, so that it will become more miscible with other liquids or will easily wet the surfaces of solid materials. In order to meet the many demands placed upon these materials by reason of their varied applications and uses, detergents are made in many forms and have many different combinations of properties. For example, detergents may be solids or liquids; they may be anionic, cationic, or nonionic; they may range from hydrophobic to hydrophillic; and they may vary cansiderably in their resistance to degradation by bacterial attack. With respect to the present invention, three properties are of particular importance, namely (1) the product must be liquid, (2) the product must have a high detergency, and (3) the product must be substantially completely degradable by the action of bacteria in a short period of time. The novel detergent composition used in this invention has these three properties as well as many others found in high quality detergents.

It is an object of this invention to provide a novel, built detergent composition. It is another object of this invention to provide a built detergent composition containing a novel nonionic surfactant which is a powerful detergent and which is degraded quickly by bacterial action. Still other objects will appear from the more detailed description of this invention which follows.

The polyoxyalkylene material used in the built detergents of this invention is a mixed condensation product having a polyoxyalkylene chain of randomly distributed oxyethylene and oxypropylene units, which chain is attached to the radical or nucleus resulting from the removal of the hydroxylic hydrogen of an aliphatic straight-chain monohydroxy primary alcohol having 12 to 20 carbon atoms per molecule, the total of oxyalkylene units in said chain being 12 to 20, preferably 14 to 16, and the ratio of oxyethylene units to oxypropylene units in said chain being 2/1 to 4.5/1, preferably 2/1 to 3.5/1.

It is well recognized in the field of alkylene oxide chemistry that when one subjects a reactive hydrogen compound to oxyalkylation, what is actually produced is a polymer of alkylene oxide except for the terminal group. Furthermore, where the amount of the alkylene oxide employed is relatively large, one does not obtain a single molecular compound having a defined number of oxyalkylene radicals, but rather, one obtains a "mixture" of closely related homologues wherein the statistical average number of oxyalkylene groups equals the number of moles of the alkylene oxide employed and the individual members present in the mixture contain varying numbers of oxyalkylene groups. Where, as in the case in the condensates used in this invention, different oxyalkylene groups are distributed randomly throughout the oxyalkylene chain, it is conventional to characterize the chain as a heteric oxyethylene-oxypropylene chain. Following the conventional manner of illustrating general formulas for polyoxyalkylenes, the mixed condensation products used in this invention can be expressed as:

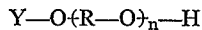

wherein Y is the radical, residue, nucleus or hydrocarbon moiety of the aforementioned alcohol having 12 to 20 carbon atoms, RO is a heteric polyoxyalkylene chain of randomly distributed oxyethylene and oxypropylene units, the total of these oxyalkylene units in the chain being "n," which is an integer of 12 to 20, preferably 14 to 16, and the ratio of oxyethylene units to oxypropylene units in the chain being 2/1 to 4.5/1, preferably 2/1 to 3.5/1, which chain is attached to said hydrocarbon moiety through an etheric oxygen linkage, i.e., the polyoxyalkylene chain is attached to the residue of the alcohol at the site of its reactive hydrogen atom. Alternatively, the polyoxyalkylenes can be illustrated as mixtures of

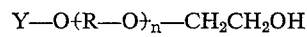

and

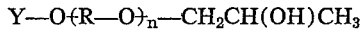

(with the latter being present in minor amounts), where Y and RO are as defined above, and "n" is an integer of 11 to 19, preferably 13 to 15.

The polyoxyalkylene products used in this invention are produced by a process in which a primary aliphatic monohydric alcohol having 12 to 20 carbon atoms per molecule is agitated and heated to a temperature of 225–400° F. while ethylene oxide and 1,2-propylene oxide are added slowly and simultaneously or as a mixture to the heated alcohol, preferably in the presence of alkaline catalysts such as the salts or the hydroxides of the alkali metals or the alkaline earth metals. When the alkylene oxides and alcohol are condensed in the proper proportion to one another, the resulting product is a liquid, nonionic, surface-active material which is a powerful detergent, and which is easily biodegradable, and such product is used in this invention to provide built detergent formulations. Generally, the condensation products used in this invention are clear liquids at a temperature in the range o f32 to 85° F. The preferred polyoxyalkylene products used in this invention are clear, water-soluble liquids at room temperature (62 to 72° F.) and have excellent freeze-thaw resistance, the total oxyalkylene units in the heteric polyoxyalkylene chain being 14 to 16 and the ratio of oxyethylene units to oxypropylene units in said chain being 2/1 to 3.5/1, and typically 3/1. The preferred products made from unsaturated alcohols (e.g., Adol 42) have melting points below 60° F., and those made from saturated alcohols (e.g., Adol 63) have melting points below 70° F.

The precise chemical nature of the higher alcohol, as well as the proportionate amounts of the three reactants, are variables which can be employed to alter the properties of the final product. Whether or not the desired condensate is liquid depends on the ratio of ethylene oxide and propylene oxide condensed with the alcohol, the molecular weight of the alcohol, and the total number of alkylene oxide molecules condensed with the alcohol. If the reactant alcohol is to some extent unsaturated, a higher amount of alkylene oxide can be employed before the product changes from a liquid to a solid. Furthermore, as higher and higher proportions of ethylene oxide to propylene oxide are employed in the condensation, smaller and smaller amounts of total oxides cause the product to be solid rather than liquid. It should be apparent from these relationships that many factors must be considered if the product of this process is to be a liquid, nonionic, surface-active detergent.

The base material of the condensation product is a higher straight-chain aliphatic monohydric primary alcohol, preferably a fatty alcohol, having an average of 12 to 20 carbon atoms per molecule. Particularly useful commercially available alcohol products found useful in the preparation of the polyoxyalkylene products used in this invention are Adol 42, Adol 63, and Conoco 1618–S, using, per mole of alcohol, 12 to 20 moles of a mixture of the alkylene oxides wherein the ratio of ethylene oxide to propylene oxide was 3/1. The base material, used to prepare condensates preferred in this invention, is a mixture of alcohols having 14 to 18 carbon atoms per molecule. We particularly prefer to use a mixture (Adol 63) of alcohols derived from tallow, such mixture having an average composition of about 5% by weight of $C_{14}$ alcohol, about 30% by weight of $C_{16}$ alcohol, and about 65% by weight of $C_{18}$ alcohol, because tallow is a natural product readily available in commerce and because the condensation products used in this invention made from such mixture have superior detergency properties and the least amount of color and odor when compared to products made from other base alcohols. This mixture of tallow-derived alcohols can be hydrogenated or non-hydrogenated. Another base material which can be used is one prepared synthetically by the polymerization of ethylene, and having approximate composition, about 20% by weight of $C_{14}$ alcohol and about 40% by weight of each of $C_{16}$ and $C_{18}$ alcohols. The alcohols generally most applicable in preparing the condensates used in this invention can be mixtures of $C_{14}$, $C_{16}$ and $C_{18}$ alcohols between these two specific compositions. These base materials from two different sources can be employed to produce similar condensation products if there is an appropriate adjustment in the properties of alkylene oxides employed in the condensation.

The foregoing alcohols are preferably natural alcohols, but it is not necessary that such be the case. The natural alcohols may be saturated or unsaturated or may be mixtures of saturated and unsaturated alcohols. Since the unsaturated alcohols result in a product of lower melting temperature, they may be preferred in certain applications. While it is possible to produce products used in this invention by starting with a particular alcohol, it is preferably to employ a mixture of two or more alcohols, and the most desirable is to have a ternary mixture of the $C_{14}$, $C_{16}$ and $C_{18}$ alcohols.

The alkylene oxides employed in preparing the condensates used in this invention are ethylene oxide and 1,2-propylene oxide. It is necessary to use a combination of these two oxides in order to obtain the desired properties in the final condensate product. If ethylene oxide is the only oxide condensed with the alcohol, the condensate is likely to be a water-soluble solid, and if propylene oxide is the only oxide condensed with the alcohol, the condensate is likely to be a water-insoluble liquid or solid. Since neither of these combinations of properties is desired in the condensates used is this invention, it is important to employ the aforementioned proportions of both oxides.

The total amount of alkylene oxides employed in preparing the condensates used in this invention is from about 12 to about 20 moles of ethylene oxide plus propylene oxide per mole of alcohol. Less or more than these amounts will produce a product which does not have the desired surface activity, and less than these amounts will cause the product to be solid rather than liquid. An intermediate preferred range is from about 14 to about 16 moles to total alkylene oxides per mole of alcohol.

Within the above concentrations of moles of total alkylene oxides per mole of alcohol, it is important, as has already been mentioned, to maintain certain concentration relationships between the ethylene oxide and the propylene oxide. This is because as the proportions of these two materials are varied, the final product changes from a water-insoluble liquid or solid to a water-soluble solid. In the broadest sense, the molar proportions of ethylene oxide to propylene oxide can vary from 2/1 to 4.5/1, depending on the composition and molecular weight of the reactant alcohol which is to be condensed with these oxides. If the alcohol has a higher proportion of $C_{14}$ materials, or if there is a certain amount of unsaturated alcohol in the reactant, the proportion of ethylene oxide to propylene oxide should be higher; and if the alcohol has a higher proportion of $C_{18}$ materials, or has essentially no unsaturation, the proportion of ethylene oxide to propylene oxide should be lower. A preferred proportion for the natural and synthetic alcohols described above is from 2/1 to 3.5/1 moles of ethylene oxide per mole of propylene oxide. For many alcohol compositions, a proportion of 3 moles of ethylene oxide per mole of propylene oxide produces a very desirable product.

The preparation of the condensates used in this invention is described in detail in said copending applications and further discussion of said preparation will be omitted in the interest of brevity, reference being made to said copending application for said details.

A particularly important property of the condensates used in this invention is the property of biodegradability. This property is the capability of degrading the condensate by bacterial attack to a material which is not a detergent. This is becoming increasingly important because the waste streams from industrial plants are emptying detergents into streams thereby producing stable foams and suspending waste material in the stream which can adversely affect the plant and fish life in the stream. If the detergent is not easily biodegradable, the detergent will last for a long period of time, causing this adverse effect upon the stream. Almost every detergent is biodegradable to some extent, but the rate of biodegradation is the most important factor. The condensate used in this invention is highly biodegradable (e.g., about 90–92% in 4 days, and 95% in 8 days), while detergents which are based on branched-chain alcohols require up to two weeks to become completely degraded, and some detergents, having aromatic nuclei, become quite stable to bacterial attack after a partial degradation has taken place.

In addition, the condensates used in this invention have good alkali and acid stability and are soluble in a wide variety of polar and non-polar solvents, which makes them readily adaptable in a wide variety of formulations, as shown below. Where desired, the condensates can be conventionally bleached, e.g., with hydrogen peroxide or sodium chlorite, to obtain colors of 1– on the Gardner scale.

In addition to their use as detergents or in detergent formulations, these condensation products also have utility as emulsifiers and wetting agents for various substrates such as wood, ceramic tile, asphalt tile, vinyl tile, metals, glass, and other substrates which can be cleansed.

The condensation products are used in this invention in built detergents which can be formulated by conventional techniques to provide liquid, semi-liquid, paste and powder built detergent formulations (see U.S. Patents 2,877,186, 3,001,945, 3,101,324, 3,156,655, and 3,324,038, and Encyclopedia of Surface-Active Agents vol. II Chap. 6 (1964) by J. P. Sisley pub. by Chem. Publishing Co., Inc., New York). Broadly, the amount of condensate to be used in preparing the built detergent formulations of this invention will be that conventionally used, i.e., an amount at least sufficient to impart to a water solution of the built formualtion, at use concentrations, a surface tension of 30 to 40 dynes/cm. In built formulations, where the condensation products are mixed, for example, with conventional alkaline builders, these condensation products will generally amount to 5 to 20 weight percent of the formulation, but in order to obtain the full detergency and economic benefits which these condensation products offer, we prefer that the amount of our novel detergent product used be in the range of 8 to 15 weight percent of the formulation. In these built formulations, the conventional components such as foamers (e.g., sodium lauryl sulfate), foam stabilizers (e.g., fatty alkanol amides, fatty amine oxides), sequestering agents (e.g., sodium tripolyphosphate), corrosion inhibitors or anti-tarnish agents (e.g., sodium metasilicate), soil suspending agents (e.g., sodium carboxymethylcellulose), inert fillers (e.g., sodium sulfate), optical brighteners, and the like, can be used in their conventional amounts. The preparation of these built formulations is conventional in the art and will not be described in the interest of brevity. The built formulations of this invention are especially suitable as heavy duty clothes cleaning detergent products. Other formulations in which our novel condensation products can be used include light duty fine fabric detergents, dishwashing liquids and powders, dairy detergents, metal cleaners, paper machine felt cleaners, floor cleaners, automobile washing detergents, textile wetting liquids, steam cleaners, emulsion cleaners, cutting oils, aircraft cleaners, bottle washing cleaners, detergent sanitizers, and the like. Since our condensation products are nonionic, they can be readily formulated with other types of surface active agents, either nonionic, anionic, or cationic. Where desired, they can be conventionally bleached, e.g., with hydrogen peroxide or sodium chlorite, to obtain colors of 1⁻ on the Gardner scale.

A preferred polyoxyalkylene (Arosurf EO–105) used in this invention is made by condensing a mixture (Adol 63) of alcohols derived from tallow with a mixture of 3 moles of ethylene oxide per mole of propylene oxide, using a total of 16 moles of alkylene oxide per mole of alcohol. Properties of this polyoxyalkylene and others are described in detail in said copending application.

The following examples further illustrate the objects and advantages of this invention, but it should be understood that this invention is not to be unduly limited to the particular details set forth in these examples.

EXAMPLE I

In a series of runs, condensation products of various alcohols with different proportions of alkylene oxides were evaluated in built formulations at a concentration of 0.2 wt. percent in water (100 p.p.m. hardness). The built formulation used in each run had the following composition:

| | Wt. percent |
|---|---|
| Condensation product | 10 |
| Sodium tripolyphosphate | 50 |
| Sodium metasilicate | 10 |
| Sodium sulfate | 26.9 |
| Sodium carboxymethylcellulose (detergent grade) | 1 |
| Optical brightener (Tinpole RT37) | 0.1 |
| Sodium dodecylbenzenesulfonate (Ultrawet K) | 2 |

The improvement in reflectance, summarized in Table I below, for each of the various built formulations was determined according to the general operating procedure described in the Terg-O-Tometer Instruction Manual of the U.S. Testing Co., Inc. The reflectance of the swatch before and after washing was measured. The percentage increase in reflectance is a measure of the efficiency of the detergent tested.

TABLE I

| Run | Alcohol | Mole ratio—alcohol/ethylene oxide/propylene oxide | Improvement in reflectance, percent |
|---|---|---|---|
| 1 | Hydrogenated tallow alcohols ($C_{12}$, 1%; $C_{14}$, 4%; $C_{16}$, 32%; $C_{18}$, 62%; $C_{20}$, 1%). | 1:12:4 | 12.0 |
| 2 | $C_{11}$–$C_{15}$ secondary alcohols | 1:9:0 | 10.5 |
| 3 | $C_{12}$–$C_{18}$ synthetic saturated alcohols. | 1:9.5:0 | 10.3 |
| 4 | $C_8$–$C_{10}$ alcohols | (¹) | 11.0 |

¹ Unknown ratio but includes both oxides.

Table I shows that the built formulation containing the condensation product of this invention (Run 1) gave a greater improvement in reflectance than the other built formulations containing condensation products outside the scope of this invention.

The following examples further illustrate a number of different formulations in which our condensation products can be used, such as the Arosurf EO–105 condensation product mentioned above.

EXAMPLE II

Acid detergent sanitizer formulation

| | Wt. percent |
|---|---|
| Condensation product | 5 |
| Alkyldimethylbenzyl ammonium chloride (50%) | 20 |
| Phosphoric acid (85%) | 35 |
| Water | 40 |

EXAMPLE III

Acid cleaner formulation

| | Wt. percent |
|---|---|
| Condensation product | 10 |
| Phosphoric acid (85%) | 35 |
| Water | 65 |

EXAMPLE IV

All-purpose cleaner formulation

| | Wt. percent |
|---|---|
| Condensation product | 8 |
| Trisodium phosphate | 1.5 |
| Potassium hydroxide | 0.1 |
| Tetrapotassium pyrophosphate | 2.5 |
| Alkylarylsulfonate (Ultrawet 60K soft) | 3.33 |
| Alkanolamide (lauric diethanol amide) | 2 |
| Water | 82.57 |

EXAMPLE V

Aluminum brightener formulation

| | Wt. percent |
|---|---|
| Condensation product | 2 |
| Butyl Cellosolve | 16 |
| Phosphoric acid (85%) | 47.2 |
| Water | 34.8 |

EXAMPLE VI

Emulsion cleaner formulation

| | Wt. percent |
|---|---|
| Condensation product | 8 |
| Water | 10 |
| Kerosene | 17 |
| Oleic acid | 7 |
| Monoethanol amine | 8 |
| Orthodichlorobenzene | 50 |

EXAMPLE VII

Furniture polish formulation

| | Wt. percent |
|---|---|
| Condensation product | 4 |
| Mineral oil | 87 |
| Water | 9 |

EXAMPLE VIII

Metal cleaner formulation

| | Wt. percent |
|---|---|
| Condensation product | 5 |
| Sodium hydroxide | 50 |
| Sodium metasilicate | 15 |
| Soda ash | 15 |
| Tetrasodium pyrophosphate | 15 |

EXAMPLE IX

Steam cleaner formulation

| | Wt. percent |
|---|---|
| Condensation product | 5 |
| Sodium hydroxide | 30 |
| Borax | 30 |
| Soda ash | 20 |
| Trisodium phosphate | 15 |

EXAMPLE X

Handcleaner formulation

| | Wt. percent |
|---|---|
| Condensation product | 9.7 |
| Deodorized kerosene | 48.6 |
| Oleic acid | 4.1 |
| Stearic acid | 2.8 |
| Sodium hydroxide | 0.4 |
| Water | 34.4 |

EXAMPLE XI

Dishwashing formulation

| | Wt. percent |
|---|---|
| Condensation product | 10 |
| Sodium alkylbenzene sulfonate (LAS type) | 25 |
| Fatty alkanol amide (lauric diethanol amide) | 5 |
| Water (plus perfume and dye) | 60 |

Various modifications and alterations to this invention will become apparent to those skilled in the art without departing from the scope and spirit of this invention, and it should be understood that the foregoing description and examples should not be construed to unduly limit this invention.

We claim:

1. A built detergent composition consisting essentially of a sequestering agent selected from the group consisting of sodium tripolyphosphate, tetrasodium pyrophosphate and tetrapotassium pyrophosphate and from about 5–20% based on the weight of said composition of a mixture of polyoxyalkylene compounds each having a heteric polyoxyalkylene chain of randomly distributed oxyethylene and oxypropylene groups attached to the residue of a straight-chain monohydroxy primary alcohol at the site of its reactive hydrogen atom, said chain having 12 to 20 oxyalkylene groups with the ratio of said oxyethylene to oxypropylene groups being 2/1 to 4.5/1, said alcohol having 12 to 20 carbon atoms per molecule and having a primary hydroxyl group as its only reactive substituent.

2. A built detergent according to claim 1 wherein said chain has 14 to 16 oxyalkylene groups with the ratio of said oxyethylene to oxypropylene groups being 2/1 to 3.5/1.

3. A built detergent according to claim 1 wherein said chain has 16 oxyalkylene groups, with the ratio of said oxyethylene to oxypropylene groups being 3, and wherein said alcohol is derived from tallow and is a mixture of fatty alcohols having 5–20% $C_{14}$ alcohol, 30–40% $C_{16}$ alcohol, and 40–65% $C_{18}$ alcohol.

References Cited

UNITED STATES PATENTS

| 2,425,755 | 8/1947 | Robert et al. | |
| 3,030,426 | 4/1962 | Moseley et al. | |
| 3,382,285 | 5/1968 | Egan et al. | 260—615 |

FOREIGN PATENTS 584,367   1/1947   Great Britain.

HERBERT B. GUYNN, Primary Examiner

U.S. Cl. X.R.

252—89, 136, 137, 138, 170; 260—615